(12) United States Patent
Schirmacher et al.

(10) Patent No.: US 9,127,962 B1
(45) Date of Patent: Sep. 8, 2015

(54) METHOD OF CONFIGURING A PERSONALIZED CONSUMER RATING AREA

(75) Inventors: Jay Schirmacher, San Diego, CA (US); David Madurzak, Poway, CA (US); Todd Frey Goodyear, San Diego, CA (US); Christopher David Nesladek, San Francisco, CA (US)

(73) Assignee: INTUIT INC., Mountain View, CA (US)

( * ) Notice: Subject to any disclaimer, the term of this patent is extended or adjusted under 35 U.S.C. 154(b) by 1094 days.

(21) Appl. No.: 12/987,701

(22) Filed: Jan. 10, 2011

Related U.S. Application Data

(62) Division of application No. 11/489,767, filed on Jul. 20, 2006, now Pat. No. 7,925,547.

(51) Int. Cl.
| | |
|---|---|
| *G06Q 30/00* | (2012.01) |
| *G01C 21/36* | (2006.01) |
| *G06Q 30/06* | (2012.01) |

(52) U.S. Cl.
CPC ........ *G01C 21/3682* (2013.01); *G06Q 30/0639* (2013.01); *G06Q 30/0641* (2013.01)

(58) Field of Classification Search
CPC .... G01C 21/32; G01C 21/26; G01C 21/3682; G01C 21/3679; G06Q 30/0639; G06Q 30/0641
USPC ............ 705/26.1–27.2, 26.9, 26.41; 701/400, 701/408–409, 433–434, 438, 526, 450, 454, 701/532
See application file for complete search history.

(56) References Cited

U.S. PATENT DOCUMENTS

| | | | |
|---|---|---|---|
| 6,349,257 B1 | 2/2002 | Liu et al. | |
| 6,401,034 B1 | 6/2002 | Kaplan et al. | |
| 7,925,547 B2 * | 4/2011 | Schirmacher et al. | ....... 705/26.9 |
| 2002/0038180 A1 | 3/2002 | Bellesfield et al. | |
| 2003/0182052 A1 | 9/2003 | DeLorme et al. | |
| 2004/0030620 A1 | 2/2004 | Benjamin et al. | |
| 2004/0093274 A1 * | 5/2004 | Vanska et al. | ................... 705/26 |
| 2004/0254723 A1 | 12/2004 | Tu | |
| 2006/0176503 A1 | 8/2006 | Brownstein | |
| 2006/0241859 A1 | 10/2006 | Kimchi et al. | |
| 2007/0150369 A1 | 6/2007 | Zivin | |

OTHER PUBLICATIONS

Multimap.com: Fighting fit and healthy; Multimap announces major deal with JJB Sports M2 Presswire. Coventry: Nov. 18, 2003, p. 1-3.

* cited by examiner

*Primary Examiner* — William Allen
(74) *Attorney, Agent, or Firm* — Park, Vaughan, Fleming & Dowler LLP

(57) ABSTRACT

A method of configuring a personalized geographical area for a user. An electronic system for providing a geographical-based service (e.g., a business directory, mapping, consumer opinions) obtains information regarding locations that can be associated with the user. Such locations may include his home address, the zip code in which he works, a business district he provides or reviews consumer opinions for, an address of an establishment for which he requests a map, etc. Using the various locations associated with the user, a personalized geographical area is configured for the user, to act as his default area when reviewing consumer opinions, requesting business locations and/or other purposes. His personalized area may change over time as the system obtains newer information regarding his activities. The personalized area may be of any size and shape, particularly non-circular, as it may be derived based on travel distances over terrain (i.e., instead of straight-line distance).

15 Claims, 3 Drawing Sheets

METHOD OF CONFIGURING A PERSONALIZED CONSUMER RATING AREA

RELATED APPLICATION

This application is a divisional application of, and hereby claims priority under 35 U.S.C. §120 to, U.S. patent application Ser. No. 11/489,767, filed 20 Jul. 2006, entitled "Method and of Configuring a Personalized Consumer Rating Area," by inventors Jay Schirmacher, David Madurzak, Todd Frey Goodyear and Christopher David Nesladek.

BACKGROUND

Providing online services or applications to users often requires the identification of some geographical context or location. For example, if a user requests the mapping of an address or site, or searches for a business or other organization within some area, the service will establish some geographical context for the user's request and/or its response. That context may determine how much area around a target destination is mapped, the scale of such a map, how many search results are served, etc.

Existing methods of establishing a geographical context are relatively simplistic, as they assume the user is only interested in a single area of limited size that is centered on a particular location, such as the user's home zip code, the address of a location being mapped, etc.

However, the inflexible manner in which a geographical context is currently selected by an electronic service often does not match a user's true area of interest. More specifically, a user may spend the majority of her time outside the area adopted by the service. For example, instead of remaining near her home, she may spend most of her time around her work location, around friends' or relatives' homes, etc. Her actual pattern of travel and living habits may therefore have little in common with the area the service assumes is most convenient or relevant for her, and the information provided by the service may therefore be of little use.

SUMMARY

In one embodiment of the invention, a method is provided for configuring a personalized geographical area for a user. An electronic system for providing a geographical-based service (e.g., a business directory, mapping, consumer opinions) obtains information regarding locations that can be associated with the user. The information may be provided directly by the user (e.g., during his interaction with the system, in response to questions) or may be received from his communication/computing device (e.g., an IP address, GPS coordinates). The locations may include his home address, the zip code in which he works, a district or area of a business he provides or reviews consumer opinions for, an address of an establishment for which he requests a map, etc.

The locations may be defined to encompass any amount of area, such as a single address or point of latitude/longitude, a city block, a zip code, a city, a neighborhood, etc. A location may also be of any shape, and may follow topographical contours, roads, governmental or political boundaries, etc.

Using the various locations associated with the user, a personalized geographical area is configured for the user, to act as his default area when reviewing consumer opinions, requesting business locations and/or other purposes. The personalized area may simply comprise a union of the disjoint set of associated locations, may also include additional area connecting two or more locations or may include an even larger area comprising all locations.

A personalized area may be of any size and shape, particularly non-circular. More specifically, the shape of the area may be derived based on travel distances over terrain (i.e., instead of straight-line distance) and therefore have an irregular outline. The user's personalized area may change over time, or be replaced by a new area as the system obtains additional information regarding his activities, as the user provides more details of his interests, etc.

DETAILED DESCRIPTION

Figure 1:
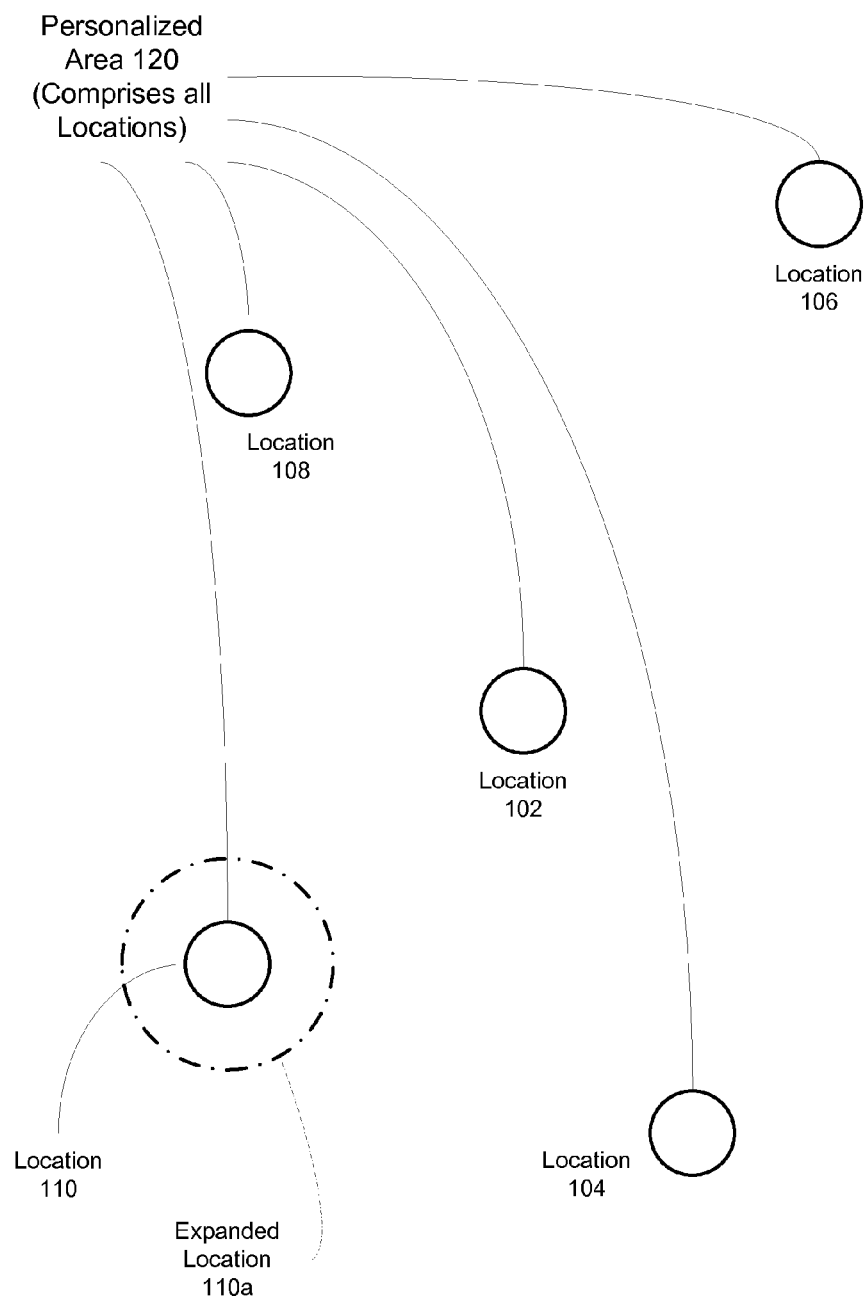
FIG. 1 is a block diagram depicting a personalized geographical area associated with a user in accordance with an embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a method is provided for configuring or determining a personalized geographical area for a user based on the user's actual activity—such as where he works, socializes, recreates, etc. Although embodiments of the invention are described herein as they may be implemented for the purpose of locating a business or other establishment of interest to the user (e.g., for the user to patronize or rate), other embodiments may be readily derived from the following description for other purposes (e.g., generating a map, giving directions) without exceeding the scope of the invention.

In particular, an embodiment of the invention is well suited for locating an establishment by type (e.g., dry cleaner, Italian restaurant), name (e.g., nearest ATM of a user's bank), rating (e.g., best or most popular pizza parlor), and so on, within a geographical area known or believed to be convenient to the user.

In prior approaches, a user identified a location (e.g., a home zip code, an address) to an electronic or online service, and an area having a fixed shape (typically circular or rectangular) was logically defined to encompass that location and serve as an assumed area of interest for that user. The center of the assumed area of interest was typically located at the identified location, and may have been circular (having a radius of a default size) or rectangular (e.g., a map view for a computer display). In either case, however, the shape (and possibly the size) of the assumed area of interest was inflexible.

The circular or rectangular area was computed in two-dimensional space, without regard for the three-dimensional nature of the actual geography (e.g., hills, rivers) and the location of roads through the area. In other words, the circular or rectangular view was derived in straight-line fashion. As a result, all points on the periphery of a circular assumed area of interest may be equidistant from the center when viewed in two dimensions (i.e., "as the crow flies"), but when one travels between a location at the center of the area and different points on its periphery, very different distances (and travel times) may have been encountered.

This prior approach may have been acceptable in some situations, such as when the user rarely strayed from the assumed area of interest and only requested maps or locations of businesses within the area, but otherwise it was often inaccurate or of little relevance to the user. In particular, for a user who spent a significant portion of his time outside the assumed area of interest, the identification of a desired type of business (e.g., a restaurant, a florist) within the area would be of little use because the user was unlikely to be in that area.

The prior art approach is even less relevant if the geography within the area is irregular, because travel times between different pairs of points that seem of equal distances in the two-dimensional representation may be very misleading. For example, if an area includes a mountain range and no good road traverses the range, the travel time involved in getting to the other side of the range means that the user is unlikely to make the journey if an equally suitable (or even somewhat less suitable) alternative can be reached faster and more easily, even if the alternative is not within the assumed area of interest.

In contrast, in an embodiment of the present invention a method is provided for configuring a geographical area that is tailored to a user's actual interests or patterns and that may reflect actual three-dimensional distances, travel times, travel routes, activity locations, or other aspects of a user's activities that could impact the part of a geographical area in which a user could be interested. For example, if the user frequently spends time at or within a limited number of different locations or areas (e.g., home, work, friend's home, traveling through specific areas or along a particular road), his area of interest may be defined to comprise those areas, with or without the inclusion of locations between those areas.

Then, instead of a monolithic and inflexible assumed area of interest based on a single piece of location information as in the prior approach, in one implementation of this embodiment of the invention a set of multiple separate areas based on multiple locations associated with a user may be adopted as the user's personalized geographical area.

In another implementation, an irregular area comprising the multiple separate areas may be adopted as the user's personalized geographical area, wherein the shape or outline of the larger area may reflect the underlying topography. In particular, instead of a two-dimensional circular or rectangular area, the personalized area may be irregular in shape but locations on the boundary of the area may be substantially equidistant (and/or have substantially similar travel times) from a logical center of the area, wherein the distance is measured along the terrain, not straight-line.

In another embodiment of the invention, a user's personalized geographical area is determined based on his activity with an electronic service for rating businesses and/or other institutions. More particularly, the user inputs to the service ratings or opinions regarding businesses he patronized (e.g., a restaurant, a shoe store, a dry cleaner) and/or views ratings input by other users. His area can then be configured based on the locations of those businesses and/or other locations. Such other locations may include places he frequently visits, whether for work, shopping, socializing, sports or other purposes.

By establishing the area of interest based on his actual travel and activity patterns, a later request from the user (e.g., for a recommended restaurant) can be tailored to provide a more relevant experience. For example, one implementation of this embodiment of the invention may help establish a default area of interest for a user when he wishes to find a specific establishment (e.g., an Italian restaurant) or type of business (e.g., gas station), locate the most convenient instance of an organization (e.g., an ATM operated by his bank), find a new dry cleaner, etc.

FIG. 1 illustrates a personalized area of interest configured for a user, according to one embodiment of the invention. In FIG. 1, personalized area 120 is defined to comprise any number of locations or areas associated with the user. Locations 102, 104, 106, 108, 110 may therefore correspond to any known addresses or locations of the user (e.g., home, work), the user's associates (e.g., significant other, friend, relative), the user's activities (e.g., golf course, shopping mall, volunteer work), and so on.

Locations may be gleaned from information provided by the user (e.g., via survey, when she rates a business, when she searches for an establishment) or received from the user's computing/communication device, such as a land-line telephone number, an IP address (which can be correlated with a physical area), GPS coordinates (e.g., from a telephone or PDA), etc.

A location may encompass an area of any size, such as a city block, a zip code, a business area, a single address, a circle of a particular radius centered on an address, etc. Different locations may encompass areas of different sizes. For example, if location 110 is an area that the user spends a particularly significant amount of time in, it may be defined as a larger area (e.g., location 110a) than a location in which the user spends less time.

In one implementation, calculation of individual locations (e.g., location 102) may be performed using the Haversine formula, which yields a straight-line (i.e., two-dimensional) distance D between two points expressed by latitude and longitude coordinates. The Haversine formula assumes the earth is spherical, with radius R, and involves the following calculations:

$\Delta lat = latitude2 - latitude1$ $\Delta long = longitude2 - longitude1$ $a = (\sin(\Delta lat/2))^2 + \cos(latitude1) * \cos(latitude2) * (\sin(\Delta long/2))^2$ $c = 2 * a \tan 2(\sqrt{a}, \sqrt{1-a})$ $D = R * c$ The Haversine formula can be used not only to determine the bounds of an individual location within a user's larger personalized area that comprises multiple separate locations, but can also be used to determine whether a particular point (e.g., an address of a business) falls within the personalized area.

In one embodiment of the invention the user's personalized geographical area 120 in FIG. 1 may therefore be defined as the union of all locations associated with the user (e.g., locations 102-110).

Figure 2:
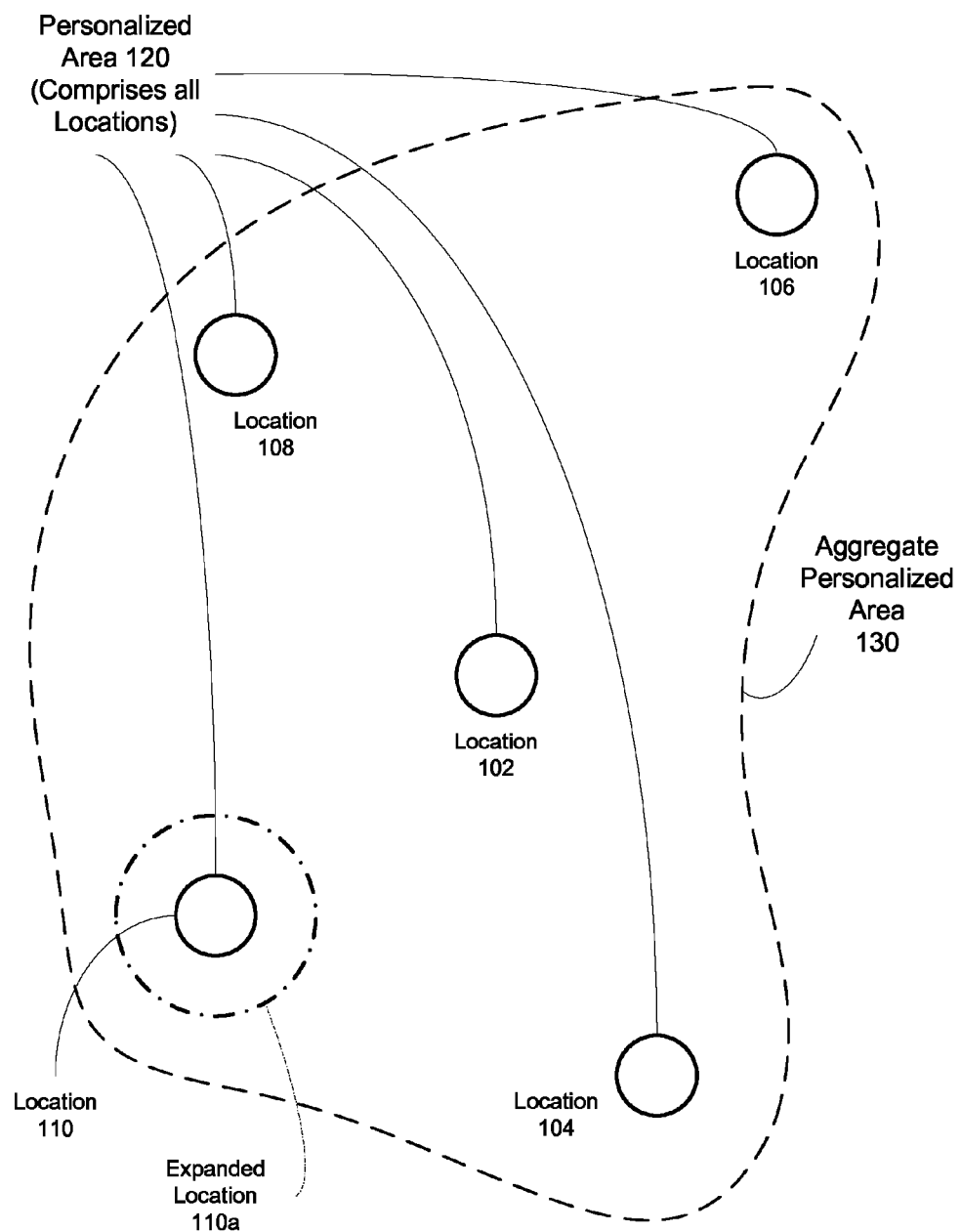
FIG. 2 is a block diagram depicting another personalized geographical area associated with a user in accordance with an embodiment of the invention.

FIG. 2 demonstrates a different personalized area constructed from locations 102-110, according to another embodiment of the invention. In this embodiment, aggregate personalized area 130 is configured to enclose the user's locations in one larger area. As illustrated, an aggregate area may have virtually any shape, depending on how the constituent locations are grouped and whether actual travel distances/times are considered.

In particular, in FIG. 2 the boundary of aggregate personalized area 130 may comprise points equidistant from one location (e.g., the user's home, a logical center of personalized area 120), based on actual or estimated travel (e.g., driving) distance. Thus, instead of the prior art approach described above that yielded a rigidly circular or rectangular area, a method of the invention described herein may configure a personalized area with regard to the time (or distance) needed to get to different locations in the area.

Therefore, if a mountain range, valley or other significant topographical feature abuts one or more locations associated with the user and no road traverses it, a location on the other side of the terrain would likely not be included in the user's personalized area. Conversely, if a highway offering fast transportation traverses or leads outward from a location, the personalized area may stretch to include some length of the highway and space to either side.

Thus, in an embodiment of the invention, a user's activity may be captured by an electronic service for purposes of generating a personalized area for that user that encompasses areas associated with her. Her activity may involve interaction with the service, such as searching for businesses in one area, rating businesses within another area, requesting a map to a location in an additional area, connecting to the service from a computer having an IP address associated with yet another area, etc. Her activity may also, or instead, involve offline activity or information such as addresses of her home, office, friends, routes of frequent travel, etc. At one extreme, her personalized area may not even encompass her home address, which likely served as the center of the inflexible area assigned by the prior art approach described above.

Figure 3:
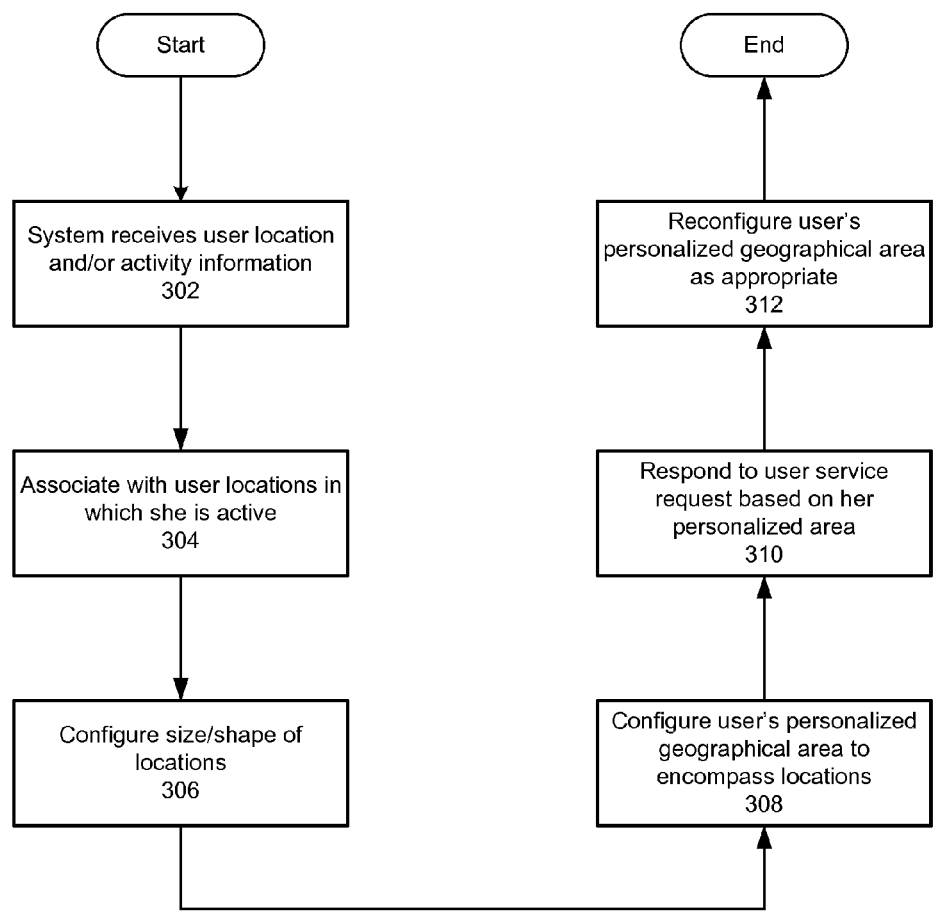
FIG. 3 is a flowchart illustrating one method of configuring and applying a user's personalized geographical area, in accordance with an embodiment of the invention.

FIG. 3 demonstrates a method of configuring and applying a user's personalized geographical area, according to one embodiment of the invention. This embodiment is implemented by or for an online or electronic system that provides some type of geographical-based service, such as receiving/displaying consumer ratings and/or opinions, displaying maps or directions, searching for a business or residence, etc. Other embodiments may be derived from the following description without exceeding the scope of the invention.

In operation 302, the system receives information regarding the user's activities, travel, habits, etc. The information may be offered by the user in order to use the service(s) offered by the system, extracted from her communication or interaction with the system, or obtained in some other way.

For example, she may provide an address, a zip code, a city, or some other position information in order to identify a specific or general location she is interested in (e.g., for providing or reviewing a consumer rating, for viewing businesses or other establishments in that area). The system may gather additional information regarding the same or other locations every time she uses the service.

As one alternative, data regarding her location(s) may be extracted from her communications with the system or from her computing/communication device. For example, an IP address or other electronic address of her computer may be included in a communication from her and mapped to a geographical area in which her computer is likely located. As another alternative, her latitude and longitude coordinates may be provided by a GPS receiver embedded in her PDA (Personal Digital Assistant) or telephone, or her mobile telephone service provider may report the location of a cell that providing telephone service to her.

As yet another alternative, she may provide information regarding her travel habits or locations she frequents via a survey or questionnaire. For example, the service may specifically elicit such information in order to help derive her personalized geographical area. In response, she may provide a set of zip codes, cities, addresses, etc. in which or at which she is frequently located, the names or addresses of businesses or other establishments she frequents, and so on.

In operation 304, the system generates a set of locations corresponding to some or all of the information it has learned regarding the user. A location may comprise an address (e.g., her home, her work, a restaurant she has patronized or reviewed a rating for), a zip code (e.g., of her billing address, of her work), a city (e.g., for which she requested a map, in which she searched for bank locations), etc.

Significantly, the location(s) associated with the user may exclude a place that would traditionally be set as her assumed area of interest. For example, as described above, a circular area centered on her home address or zip code may have traditionally been assumed to be her area of interest in a prior art approach. In the method of FIG. 3, however, her home location may not even be identified as being relevant if there is little or no data received indicating that she is very active or spends much time there (e.g., no ratings submitted or viewed of businesses in or near her home zip code).

In operation 306, the locations defined in operation 304 may be configured to be of the same or different sizes and shapes. In particular, different types of locations (e.g., addresses, zip codes, cities) may be defined with different sizes and/or shapes, which may depend on the amount or quality of information received from or about the user, thereby in effect weighting the relevance of the locations.

For example, if multiple data are received indicating that the user has been quite active in a particular zip code (e.g., she rated several businesses in that zip code, her home and her work are in the same zip code), then the location pertaining to that zip code may include much or all of the underlying area. Conversely, if only one data point was received regarding a particular address in a city some number of miles away from her home and work locations, the area for that location may be defined as just that single address, just the block that includes the address, etc. Another area may comprise some other subset of a zip code (e.g., a single zip+4 code or postal carrier delivery route).

The shapes of different locations associated with the user may also vary. As described above, for example, actual travel (e.g., driving, walking) distances may be considered in shaping an area or location, so that the shape of the area when viewed in two dimensions may be irregular (e.g., non-circular, non-rectangular). Alternatively, however, a location may be defined by a two-dimensional circle having a center (e.g., at a particular address or latitude/longitude) and a specified radius (which may differ from location to location), or by a rectangle or other regular area.

In operation 308, the user's personalized geographical area is configured from the locations identified in operation 304 and configured in operation 306.

In one implementation, a simple union of the locations is adopted as her personalized area. In this case, her personalized area may therefore be a set of separate disconnected areas.

In another implementation, however, her personalized area may encompass the identified locations and additional area interconnecting some or all of the locations. For example, a geographic center of the set of locations may be identified and, using a radius that will encompass all locations, her personalized area may be defined as the area bounded by points equidistant from that center (e.g., based on actual travel distance (not straight-line distance)).

Alternatively, the additional area may be configured to follow a business district or governmental boundary (e.g., county line, city limit), a transportation route (e.g., a highway, the user's commuting route), a topographical feature (e.g., a mountain, a lake).

The user's personalized area may be characterized as "irregular," in that it consists of a set of physically separate locations or an area having an outline determined by actual travel distances from a given point or location (not two-dimensional straight-line distances).

In operation 310, the user's personalized geographical area is applied to a service request from the user. For example, if she requests ratings of restaurants by other users (e.g., and doesn't specify a different area of interest), ratings may be provided mainly or only for establishments in her personalized area. Similarly, if she initiates a search for businesses, the search may be conducted only (or mainly) in her personalized area. Thus, she may be served results only for establishments within her personalized geographical area, or results in her area may be presented first or with higher weights.

In operation 312, the user's personalized geographical area may evolve over time based on her further activity and behavior. For example, if she ceases providing or viewing ratings in one of the locations associated with her, the size (or shape) of that location may change or the location may even be disassociated from her. Conversely, if she becomes active in a different location, that new location may be associated with her after some level of activity (e.g., a single rating submitted or viewed, two searches). Her personalized area may therefore be reconfigured if and when her associated locations change.

Similarly, her personalized area may be altered if the boundary of a city or county changes, if a new road is opened that makes it easier or faster to reach some area, if a bridge over a river is closed, etc.

Therefore, in the method depicted in FIG. 3, a personalized geographical area is defined and configured for a user based on her actual pattern of activity, which may include locations she actual frequents (e.g., addresses of businesses she rates, her workplace, a friend's address that she maps and from which she connects to an electronic service). Her personalized area may exclude a location previously or initially identified as her default area of interest (e.g., the location of her home), and may be reconfigured over time as her activities and interests change.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of defining a user's personalized geographical area, the method comprising:
   defining, by a computer, a plurality of discrete and non-overlapping locations based at least in part on data captured from activity of the user, wherein each location comprises a location of the user or a location identified by the user;
   generating, by the computer, a plurality of areas for the plurality of locations, the defined areas having a size and shape, the size being based at least in part on an amount of activity of the user associated with each location, wherein the amount is determined from the captured data;
   configuring, by the computer, a personalized geographical area comprising a union of the plurality of generated areas, the personalized geographic area comprising the defined areas but not including locations between the generated areas;
   receiving from the user a first request for:
      a consumer rating of an establishment; or
      a location of an establishment matching one or more criteria specified by the user; and
   generating an interface for display to the user, wherein the interface identifies only one or more establishments within said personalized geographical area.

2. The method of claim 1, further comprising, reconfiguring said personalized geographical area over time, based on activity of the user.

3. The method of claim 1, wherein said generating comprises:
   receiving one or more requests prior to the first request;
   wherein the one or more requests identify a subset of the plurality of locations.

4. The method of claim 1, wherein said personalized geographical area further comprises additional area interconnecting two or more of the separate disconnected areas.

5. The method of claim 4, wherein said personalized geographical area is irregular and a size of said personalized geographical area is based on travel distances between points within said personalized geographical area rather than straight-line distances between the points.

6. A non-transitory computer-readable storage medium storing instructions that when executed by a computer cause the computer to perform a method of defining a user's personalized geographical area, the method comprising:
   defining a plurality of discrete and non-overlapping locations based at least in part on data captured from activity of the user, wherein each location comprises a location of the user or a location identified by the user;
   generating a plurality of areas for the plurality of locations, the defined areas having a size and shape, the size being based at least in part on an amount of activity of the user associated with each location, wherein the amount is determined from the captured data;

configuring a personalized geographical area comprising a union of the plurality of generated areas, the personalized geographic area comprising the defined areas but not including locations between the generated areas;

receiving from the user a first request for:
  a consumer rating of an establishment; or
  a location of an establishment matching one or more criteria specified by the user; and generating an interface for display to the user, wherein the interface identifies only one or more establishments within said personalized geographical area.

7. The non-transitory computer-readable storage medium of claim 6, further comprising, reconfiguring said personalized geographical area over time, based on activity of the user.

8. The non-transitory computer-readable storage medium of claim 6, wherein said generating comprises:
  receiving one or more requests prior to the first request;
  wherein the one or more requests identify a subset of the plurality of locations.

9. The non-transitory computer-readable storage medium of claim 6, wherein said personalized geographical area further comprises additional area interconnecting two or more of the separate disconnected areas.

10. The non-transitory computer-readable storage medium of claim 9, wherein said personalized geographical area is irregular and a size of said personalized geographical area is based on travel distances between points within said personalized geographical area rather than straight-line distances between the points.

11. A computer system, comprising:
  a processor; and
  a non-transitory processor-readable storage medium storing instructions that when executed by the processor cause the computer system to perform a method of defining a user's personalized geographical area, the method comprising:
    defining a plurality of discrete and non-overlapping locations based at least in part on data captured from activity of the user, wherein each location comprises a location of the user or a location identified by the user;
    generating a plurality of areas for the plurality of locations, the defined areas having a size and shape, the size being based at least in part on an amount of activity of the user associated with each location, wherein the amount is determined from the captured data;
    configuring a personalized geographical area comprising a union of the plurality of generated areas, the personalized geographic area comprising the defined areas but not including locations between the generated areas;
    receiving from the user a first request for:
      a consumer rating of an establishment; or
      a location of an establishment matching one or more criteria specified by the user; and
    generating an interface for display to the user, wherein the interface identifies only one or more establishments within said personalized geographical area.

12. The computer system of claim 11, wherein the method further comprises reconfiguring said personalized geographical area over time, based on activity of the user.

13. The computer system of claim 11, wherein said generating comprises:
  receiving one or more requests prior to the first request;
  wherein the one or more requests identify a subset of the plurality of locations.

14. The computer system of claim 11, wherein said personalized geographical area further comprises additional area interconnecting two or more of the separate disconnected areas.

15. The computer system of claim 14, wherein said personalized geographical area is irregular and a size of said personalized geographical area is based on travel distances between points within said personalized geographical area rather than straight-line distances between the points.

* * * * *